United States Patent [19]

Spevack

[11] 4,172,116
[45] Oct. 23, 1979

[54] PROCESS FEED AND EFFLUENT TREATMENT SYSTEMS

[75] Inventor: Jerome S. Spevack, New Rochelle, N.Y.

[73] Assignee: Deuterium Corporation, New Rochelle, N.Y.

[21] Appl. No.: 658,060

[22] Filed: Feb. 13, 1976

Related U.S. Application Data

[60] Division of Ser. No. 489,449, Jul. 17, 1974, Pat. No. 3,984,518, which is a continuation of Ser. No. 126,498, Mar. 22, 1971, abandoned.

[51] Int. Cl.² ............................................. C01B 5/02
[52] U.S. Cl. .................................. 423/580; 422/189
[58] Field of Search .................. 423/580, 563, 580 H; 23/270.5 W; 422/159, 190, 189, 228, 256–259

[56] References Cited

U.S. PATENT DOCUMENTS

| | | | |
|---|---|---|---|
| 3,431,080 | 3/1969 | Rostaing | 423/580 H |
| 3,789,113 | 1/1974 | Thayer | 423/580 H |
| 3,983,226 | 9/1976 | Nazzar et al. | 423/580 |

FOREIGN PATENT DOCUMENTS 865022  3/1971  Canada .................. 423/580 H

*Primary Examiner*—Earl C. Thomas
*Attorney, Agent, or Firm*—Hall & Houghton

[57] ABSTRACT

A liquid feed and effluent system to recover dissolved process gas (e.g. $H_2S$) from an effluent process liquid (e.g. water), which liquid may also contain dissolved solid components (e.g. soluble salts); the system heats the feed liquid with heat recovered from the effluent liquid, saturates the so heated feed liquid with process gas, which gas may also contain inert gas components, and separately discharges from the system such inert gas components and effluent liquid from which process gas and heat have been recovered. In the combination the dissolved process gas is preferably recovered from the effluent liquid by flashing at progressively reduced pressures and final vapor stripping thereof at the most reduced pressure.

32 Claims, 2 Drawing Figures

PROCESS FEED AND EFFLUENT TREATMENT SYSTEMS

CROSS REFERENCE TO RELATED APPLICATIONS

This application is a division of application Ser. No. 489,449 filed July 17, 1974 (now U.S. Pat. No. 3,984,518, issued Oct. 5, 1976) itself a continuation of application Ser. No. 126,498 filed Mar. 22, 1971 (now abandoned).

BACKGROUND OF THE INVENTION

1. Field of Invention

This application relates to improvements in feed and effluent treatment particularly but not exclusively adapted to use in dual temperature exchange systems utilizing an external water source as one of the process fluids and a partially water soluble gas as another process fluid.

2. Description of the Prior Art

In my prior U.S. Pat. Nos. 2,895,803 issued July 21, 1959 and 3,142,540 issued July 28, 1964 are disclosed a regenerative stripper system for stripping gas (e.g. $H_2S$) from a liquid (e.g. water) with the aid of steam supplied at temperature considerably higher than the temperature at which the liquid became saturated with the gas, followed by a partial recovery of the heat by indirect contact heat exchange with a cold process fluid.

SUMMARY OF THE INVENTION

Objects of the invention are to provide an improved feed and effluent treatment system adapted for improving the recovery of a gas (e.g. $H_2S$) from solution in a liquid (e.g. water) which liquid also contains dissolved nonvolatile components (e.g. the nonvolatile solutes contents of sea water and other contaminated waters), at low temperatures, and with greater effectiveness than said prior art systems; for conditioning the liquid feed supply for such systems in a simple and effective way; and for producing a distilled liquid by-product essentially free of the solubles of the feed.

DESCRIPTION OF PREFERRED EMBODIMENTS

Figure 1:
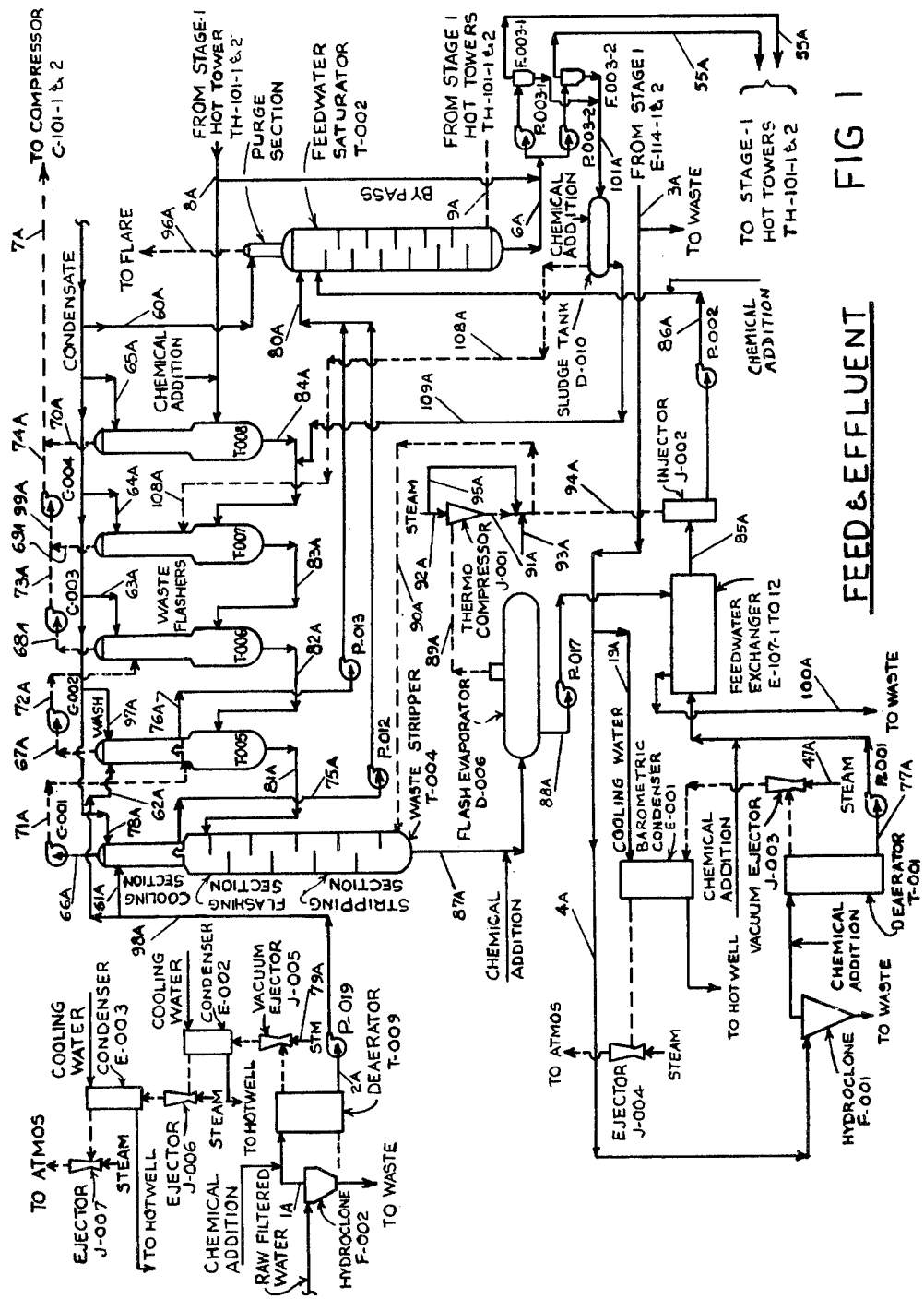
FIG. 1 is a simplified flow diagram of an integrated feed and effluent system for a hydrogen sulfide-water process, according to an embodiment of the invention in which a contaminated water (e.g. sea water) is the feed supply.

The embodiments shown in the drawings are particularly adapted for supplying treated liquid feed to, and treating liquid effluent from, a system processing such liquid and a gas partially soluble therein, such as is disclosed in my concurrently filed application Ser. No. 126,692, (now U.S. Pat. No. 3,860,698 issued Jan. 14, 1975), which exemplifies a gas/liquid contact system as comprising a relatively hot contact zone, e.g. at 130° C., operating at an elevated pressure, e.g. 325 psi, and a relatively cold contact zone, e.g. at 30° C., operating at a slightly lower elevated pressure, e.g. 305 psi, with a flow of the gas being circulated through the hot and cold zones by pumping said gas from the cold zone at said slightly lower elevated pressure to said hot zone at said elevated pressure and is made a part hereof by reference.

By use of these embodiments, applied in the production of heavy water, advantage may be taken of the fact that sea water contains approximately 5% more deuterium content than do river and lake waters.

Referring to FIG. 1 of the accompanying drawings:

The feed water (e.g. sea-water) treating system is integrated in operation with the treatment of the impoverished sea-water discharged from the hot tower for disposal to waste, and provides the heated, $H_2S$ saturated sea-water for deuterium extraction in the dual temperature exchange system. In the illustrated embodiment, the feedwater has initially been utilized for cooling of process fluids in the dual temperature exchange system and is received slightly heated via 3A for treatment.

The feedwater then passes via 4A through a rubber-lined carbon-steel hydroclone cleaner F-001 where solids are removed in the underflow and discharged as waste. The cleaned feedwater then enters an epoxy-lined carbon-steel feed deaerator T-001 where dissolved oxygen and carbon dioxide gases are removed. Gases are withdrawn by the two stage action of two ejectors J-003 and J-004 supplied with steam, e.g. as via 47A, and a barometric intercondenser E-001. Water from the bottom of the condenser discharges to a hot well.

Oxygen is removed to prevent corrosion of metal surfaces and to prevent sulfur precipitation when the water comes into contact with $H_2S$ used in the process, e.g. by the reaction $2H_2S + O_2 = 2H_2O + 2S$. Insoluble sulfur precipitates can clog the process equipment. Carbon dioxide is removed to prevent the dilution of the $H_2S$ process gas, and also to prevent accelerated corrosion of the equipment as a consequence of the carbonic acid formed in aqueous solution thereby. The productivity of the dual temperature system is reduced in proportion to the accumulation of inert or non-exchanging contaminants in the process gas. The cooling water via 19A for the barometric intercondenser E-001 is split from the sea-water flow received via 3A. Motive steam for the ejectors is taken off the intermediate pressure steam header.

A pump P-001 withdraws feedwater from the bottom of the deaerator via 77A and passes it to the tube side of the feedwater heat exchangers E-107-. A connection is provided in the passage to the exchangers for chemical addition, e.g. sulfuric acid injection. By this means suitable chemical agents or acid may be added to dissolve scale, e.g. precipitated sulfates or carbonates, if such should form on the heat exchanger tubes from the heating of the sea-water.

In the illustrated embodiment the E-107- heat exchangers are series connected in three parallel trains of four exchangers each. Hot sea-water effluent from the hot tower of the dual temperature system via 8A, after removal of dissolved hydrogen sulfide gas, is passed via 87A, 88A through the shell side of said exchangers whereby the feedwater in the tube side is heated to approximately 250° F. A thermocompressor J-001, supplied with steam via 92A, provide steam, which in part has been recovered via 89A from the sea-water effluent by flash evaporator D-006, via 94A to an injector J-002 for further feedwater heating. Additional steam, as required, may also be supplied to 94A via 95A or 93A. The steam from 94A is injected into the feedwater at a rate controlled so as to maintain a feedwater temperature of 266° F.

A pump P-002 passes the heated sea-water feedwater stream from J-002 via 86A to the top of the feedwater saturator T-002. The saturator is an Inconel-clad steel tower, designed to saturate approximately 2,000,000 pounds of heated feedwater per hour with $H_2S$ at 325 psia. An additional stream of heated sea-water that has been used in the upper cooling sections of the waste stripper T-004 and waste flasher T-005 for gas cooling, hereinafter described, is also discharged into the top of the saturator T-002. These streams merge and flow downward against a counter-current flow of $H_2S$ gas, becoming saturated, and constitute the sea-water feed supply to the feed section of the hot tower of the dual temperature system.

The $H_2S$ saturated feedwater is discharged from the bottom of the saturator via 6A and is pumped by the pumps P-003- to Inconel hydroclone cleaners F-003- for removal of heavy metal sulfides and other solids formed by reaction of dissolved minerals in the sea-water under the conditions existing in the saturator. The underflow from these hydroclone cleaners passes via 101A to a sludge tank D-010 for treatment before being removed, e.g. discharged into the effluent stream via 109A. Such treatment may include chemical addition, for example of an acid which reacts with the solids to solubilize them and to form $H_2S$ gas for return to the dual temperature process gas system via 108A-7A. The saturated sea-water feedwater passes via 55A from the hydroclones to the top of the feed section of the stage 1 hot towers.

The $H_2S$ delivered via 5A to the saturator T-002 is bled as a purge stream from the humidification section of the dual temperature stage 1 hot towers. Within the saturator, the $H_2S$ reacts with and decomposes dissolved bicarbonate salts, releasing carbon dioxide gas ($CO_2$) and forming the hydrosulfide ($HS^-$ ion) and to a small degree the sulfide ($S^=$ ion) salts in substitution. The $CO_2$ together with other undissolved gases, e.g. nitrogen and hydrogen, are passed through the purge tower section at the top of the saturator. A small stream of relatively pure water, e.g. condensate, is introduced via 60A into the top of the purge tower section to absorb $H_2S$ contained therein and this water flows downward through the purge section and then merges with the feedwater stream in the saturator. The remaining gas stream, which comprises substantially all of the $CO_2$ and inert gas content of the fluids delivered to the saturator T-002, is removed via 96A from the system, e.g. to a flare for discharge to the atmosphere.

Cooling water for the gas cooling sections on top of the waste stripper T-004 and on top of the waste flasher T-005 is taken off via 1A from the sea-water supply line serving the dual temperature system stage 1 dehumidifier process liquid coolers. This water is passed through a hydroclone cleaner F-002 for removal of solids and the underflow is discharged to waste. The cleaned water passes to a deaerator T-009.

Chemical addition, e.g. of sulfuric acid, may be added to this sea-water through a connection upstream of the deaerator. Acid is added to decompose dissolved bicarbonate salts and evolve $CO_2$ before this water enters the waste flasher T-005 and waste stripper T-004, where it comes in contact with $H_2S$. The acid-generated $CO_2$ and other dissolved gases are removed from the water in the deaerator T-009 by the 3-stage action of three ejectors J-005, J-006 and J-007 supplied with steam, e.g. as via 79A and two barometric condensers E-002 and E-003, and the deaerated water is then withdrawn by pump P-019 via 2A and is passed via 98A and via 61A to the waste stripper T-004 and via 62A to the waste flasher T-005.

The effluent stream leaving via 100A is comprised principally of deuterium-depleted sea-water from the dual temperature stage 1 hot towers together with the treated underflow from hydroclone cleaners as above described.

A principle purpose of the effluent treating system is to recover the $H_2S$ which is present at a concentration of about two percent in the sea-water effluent from the dual temperature system. Another is to recover heat from the effluent which is at 266° F. when it leaves the stage 1 hot towers. The $H_2S$ is recovered in the waste flashers T-008 to T-005 and the waste stripper T-004 and returned via 7A to the dual temperature system. Heat is recovered in the flash evaporator D-006 where the sea-water effluent after removal of $H_2S$ is partially flashed to steam for use in part via 90A in the waste stripper and in part via 94A to heat the incoming sea-water feed supply, and also in a series of heat exchangers E-107- where the remaining heat of the sea-water effluent before its discharge to waste is used to heat the incoming sea-water feed to the dual temperature system.

$H_2S$ is recovered by passing the hot sea-water effluent discharged from the feed section of the stage 1 hot tower through a series of four waste flashers T-008, T-007, T-006 and T-005 in that order supplied via 8A, 84A, 83A, and 82A, respectively. These are horizontal pressure vessels made of Inconelclad steel plate and consist of a flashing section and a gas cooling tower section wherein the released hot $H_2S$ is cooled by countercurrent direct contact with a flow of cool water. As illustrated, three of the waste flashers T-008, T-007, and T-006 have integrally mounted contactor cooling towers. One, T-005, operates in conjunction with a separately mounted contactor tower as is shown by the seal tray just below the outlet to 76A which only allows gas to pass therethrough and liquid to be discharged via 76A to pump P-013 which delivers to T-002 via 80A. The waste flashers operate at successively lower pressures, e.g. 305, 250, 175 and 75 psi, respectively. At each stage of pressure reduction, $H_2S$ is evolved from the effluent. The flashed-off $H_2S$ flows upward to the gas cooler sections where water vapor is condensed and the $H_2S$ is cooled by direct contact with condensate supplied via 63A, 64A, 65A and 97A, respectively. The flashed $H_2S$ gas delivered via 67A, 68A and 69A is then repressurized, e.g. by compression with gas compressors C-002, C-003 and C-004 in stages respectively to 305 psi, and returned via 72A, 73A, 99A, 74A and 7A to compressors C-101-1 and 2 of the dual temperature stage 1 gas system shown in FIG. 9 (alt), Parts (A) and (B), of the aforesaid U.S. Pat. No. 3,860,698. The gas from waste flasher T-008 is discharged therefrom via 70A at the 305 psi pressure of the top of the stage 1 cold tower and therefore does not require further pressure.

After passing through the waste flashers, the sea water effluent is passed to the waste stripper T-004 via 81A where the remaining dissolved $H_2S$ is removed in part by a flash to 35 psi and the remainder by action of a countercurrent flow of stripping steam. This waste stripper is an Inconel tower approximately 85 feet high. It consists of an upper cooling section also supplied with condensate wash via 78A, separated from a lower flashing and stripping section by the seal tray just below the outlet to 75A which only allows gas to pass therethrough and liquid to be discharged via 75A to pump P-012 which also delivers to T-002 via 80A. The $H_2S$ is evolved from the effluent in the flashing section and rises through the cooling section, and the effluent liquid proceeds downward to the stripping section where it flows against a countercurrent flow of stripping steam. $H_2S$ concentration in the sea-water effluent leaving the waste stripper is less than one ppm and the $H_2S$ stripped therefrom passes via 66A to the waste flasher compressor C-001 for compression and return to stage 1 via 71A to T-005 and the compression in stages as aforesaid.

The sea-water effluent from the waste stripper T-004 passes to a flash evaporator D-006 where a part of the water is flashed and evaporated to steam. The flash evaporator is a copper-nickel-alloy vessel approximately 6 feet in diameter and approximately 13 feet long. It operates in conjunction with a thermo compressor J-001 to recover some of the energy present in the effluent. The thermo compressor creates a reduced pressure in the evaporator vessel, converting a portion of the effluent to steam, which is exhausted via 91A for use as stripping steam via 90A to the waste stripper and for injection via 94A to the main sea-water feed stream to the dual temperature system. The hot effluent from the flash evaporator via 88A is pumped by pump P-017 through the shell side of the heat exchanger train E-107- to heat the main sea-water feedwater stream on the tube side therein passing from P-001 to J-002 via 85A. This cooled effluent is then discharged via 100A as waste.

The underflow from the sea-water feed hydroclones F-003- is discharged via 101A to a sludge tank D-010 where sulfuric acid is added. The sludge tank is an Inconel pressure vessel. $H_2S$ is evolved in the tank from the reaction of acid with sulfides removed in the hydroclone cleaners.

As shown, the evolved $H_2S$ vapor is passed to the gas cooler tower on the top of the waste flasher T-007 to join the flow of recovered gas to be returned to the dual temperature stage 1, and the discharge from the sludge tank via 109A is mixed with the effluent passing from waste flasher T-008 via 84A. Any excess acid which may be present in the sludge tank discharge continues to react with dissolved sulfides in the sea-water effluent to further evolve $H_2S$ gas which is chemically or otherwise bound and would not otherwise be released in the flashing and stripping operations.

The evolved $H_2S$ gas passes from the waste flashers and the waste stripper to the waste flasher compressors. In the illustrated embodiment, the compressors C-001, C-002, C-003 and C-004 may be driven by a single steam turbine through a common shaft, which together comprises a multi-stage compressor unit for compression of the released $H_2S$ for return to the dual temperature system.

Figure 2:
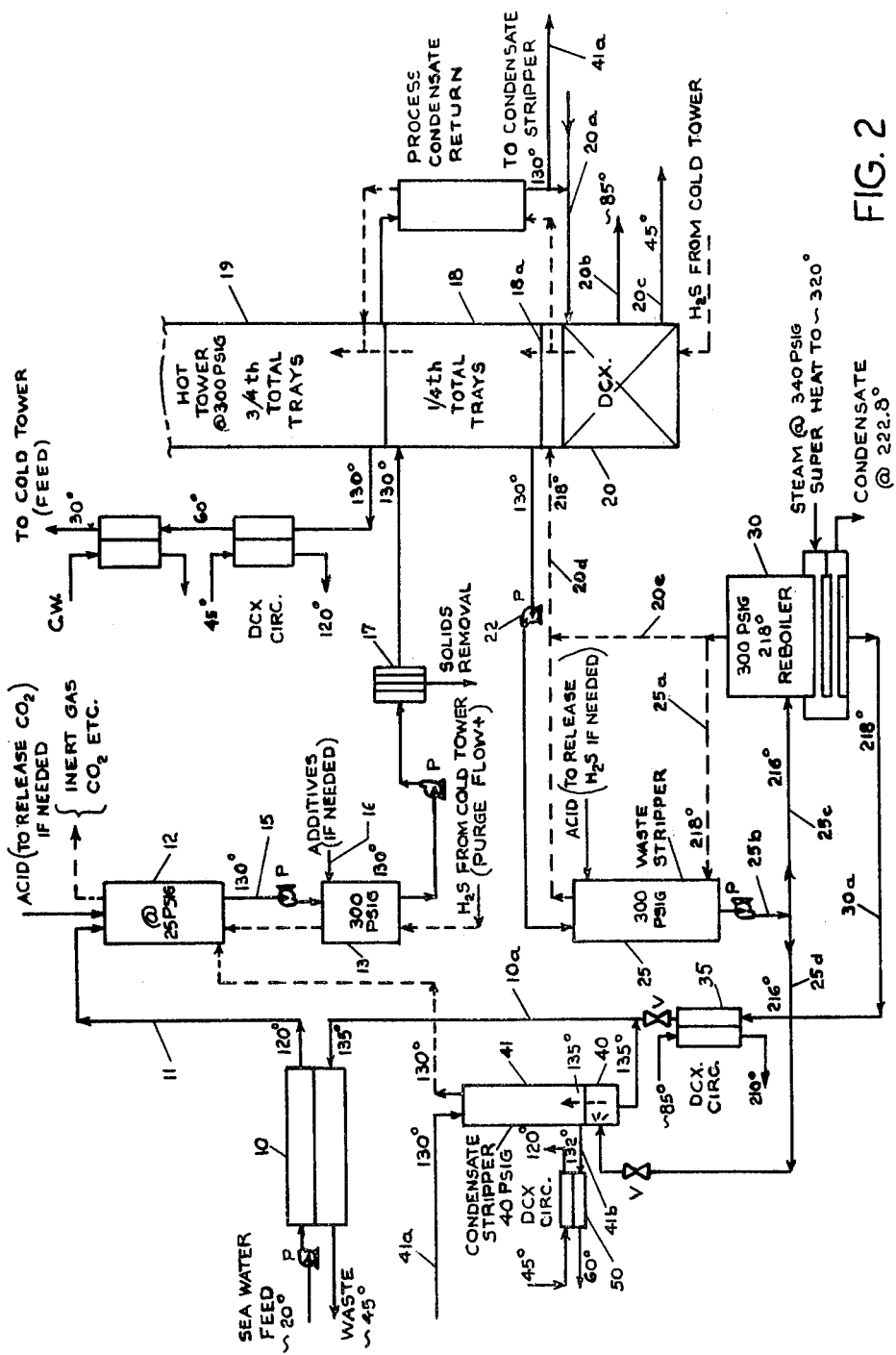
FIG. 2 is a schematic diagram of another embodiment.

Referring now to FIG. 2 of the accompanying drawings:

In this embodiment the cold sea water feed (e.g. at 20° C.) is passed through an indirect contact heat exchanger 10 in countercurrent to the treated effluent passing to waste, becoming heated (e.g. to 120° C.) while the effluent is cooled (e.g from 135° C. to 45° C.). The heated sea water via 11 passes to a two stage $H_2S$ saturator and inert gas and dissolved $CO_2$ remover 12, 13 wherein a countercurrent contact with a stream of $H_2S$ the water becomes saturated therewith first at a lower pressure and then at a higher pressure, and the dissolved carbonates therein are converted to hydrosulfides and sulfides, freeing $CO_2$ gas which is vented together with any inert gas content of the $H_2S$ and/or water streams. In the first stage 12 the water feed is heated at a low pressure (e.g. 25 psig) approaching the temperature of the $H_2S$ gas stream (about 130° C.) depending on the quantity of hot gas delivered. In the second stage 13 to which the treated water from the first stage is pumped via 15 the pressure is higher (e.g. 300 psig) and the saturation with the gas at this pressure is accomplished therein. For mineral removal or recovery, etc. the liquid (e.g. sea water) may be treated with additives supplied as via 16 for precipitating dissolved materials which can then be removed as by a filter, decanter or other separator 17, from which the treated liquid saturated with gas at the temperature and pressure of the process feed section 18 (shown as a feed section comprising the lower quarter of the trays section of the hot tower 18, 19 of a dual temperature hot tower and cold tower exchange unit is delivered to said feed water section, as shown.

In this feed section 18 the saturated liquid passes in countercurrent exchange with a circulating stream of gas ($H_2S$) which has been passed through the heater and humidifier 20 where it is heated and humidified and brought to the temperature of the feed section 18. The gas heating in the form shown is accomplished in part by direct contact with a branched circulation of water entering via 20a and exiting at different temperature levels (e.g. 85° and 45° C.) via 20b and 20c, augmented by injection of steam via 20d (e.g. at 218° C.) sufficient to raise it to the temperature of the feed section 18 and tower 19, (e.g. 130° C.). The feed fluid stream leaving the feed section 18 above the seal tray 18a (which allows gas to pass upwardly therethrough but prevents downward flow of feed liquid therethrough) is pumped via 22 to the waste stripper 25 operating at a slightly higher pressure to allow stripped gas ($H_2S$) and steam to return via 20d to the top of the humidifier section 20. Steam is supplied via 25a to the bottom of the stripper 25 passing countercurrent to the $H_2S$ saturated liquid from 22, whereby the water leaving 25 via 25b is substantially free of gas (e.g. $H_2S$). Additional steam as needed is supplied to 20d by 20e from a suitable source such as the boiler 30.

In the form shown a portion of the water stripped of $H_2S$ is passed from 25b via 25c as feed to the boiler 30 wherein it is partially evaporated by an external heat supply. The unevaporated portion via 30a and liquid via 25d may be merged, and be used in part to heat at least a portion of the cyclic flows via 20c and/or 20b in a heat exchanger 35, and may in part be sent to a flasher 40 operating at reduced pressure where steam is evolved which may be used in stripper 41 to strip $H_2S$ from a separate flow of $H_2S$ saturated condensate formed by the cooling and dehumidification of the hot process gas from 19, about equal to the quantity of steam introduced at 20d. Said condensate, which is supplied via 41a from the Process Condensate Return element paralleling 18, enters 41 via 41a at about 130° C. and exits via 41b at about 132° C. and then passes in counter-current heat exchange in 50 to heat another portion of said cyclic flows 20b and/or 20c. The remaining liquid from 40 and the cooled liquid from 35 via 10a is passed through the heat exchanger 10, as above described.

While there have been described herein what are at present considered preferred embodiments of the invention, it will be obvious to those skilled in the art that modifications, including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be described and included therein.

I claim:

1. The method of operating a gas/liquid contact process in which the gas is at least partially soluble in the liquid, there being a relatively hot contact zone at an elevated pressure, including the steps of extracting at least a portion of the liquid after passage through said hot zone, reducing the pressure of extracted liquid by flashing through at least one pressure reduction means to remove a portion of the dissolved gas therefrom, and returning the gas thus recovered to the process, at least gas recovered at said one pressure reduction means being returned by absorption in liquid feed entering the process.

2. The method as claimed in claim 1 wherein said pressure reduction step is carried out by passage of said portion through a first and a second lower pressure reduction device, the gas evolved at the first said device being passed for absorption into feed entering the process.

3. The method as claimed in claim 1 wherein said portion is depressurized by passage through at least two progressively lower pressure reduction devices, including the step of raising the pressure of the gas evolved at at least one of said devices for contact with the feed liquid entering the process.

4. The method as claimed in claim 1 wherein stripped effluent is passed in heat exchange relation with water which is then used to heat and humidify gas circulating through the process.

5. In an isotope concentration process in which hydrogen sulfide gas is passed in countercurrent contact with water through a hot tower zone, a cold tower zone and humidity control means at elevated pressures, the method of recovering hydrogen sulfide gas dissolved in the water, including the steps of extracting at least a portion of the water leaving the hot zone, reducing the pressure of the water portion by passage through at least one pressure reduction means to flash off a portion of the gas and returning the hydrogen sulfide so recovered to the process, at least gas recovered at said one pressure reduction means being returned by absorption in liquid feed entering the process.

6. The method as claimed in claim 5 wherein said pressure reduction step is carried out by passage of said portion through a first and a second lower pressure reduction device, the gas evolved at the first said device being passed for absorption into feed entering the process.

7. The method as claimed in claim 5 wherein said portion is depressurized by passage through at least two progressively lower pressure reduction devices, including the step of raising the pressure of the gas evolved at at least one of said devices for contact with the feed liquid entering the process.

8. The method as claimed in claim 5 wherein stripped effluent is passed in heat exchange relation with water which is then used to heat and humidify gaseous hydrogen sulfide circulating through the process.

9. In an isotope exchange apparatus having a liquid feed means, a hot tower zone, a cold tower zone, and a humidifier zone providing heated gas to the hot zone and receiving liquid from the hot zone having gas dissolved therein, a gas recovery system comprising at least one pressure reduction means connected to receive at least a portion of hot liquid effluent from said hot tower zone, and gas absorption means connected with said pressure reduction means and said liquid feed means to receive gas flashed off from liquid effluent on passage through the pressure reduction means for absorption into incoming feed liquid.

10. An apparatus as claimed in claim 9 wherein said pressure reduction means comprises a first pressure reduction device and a second pressure reduction device, said gas absorption means being connected to at least one said pressure reduction device by way of a compressor, whereby a said pressure reduction device may be operated at a pressure below that of said gas absorption device.

11. An apparatus as claimed in claim 9 including means to pass stripped effluent water in heat exchange relation with water circulating through said humidifier zone.

12. An apparatus as claimed in claim 9 including heating means to provide vapor passing upwards in a tower in countercurrent contact with the liquid on its passage from said pressure reduction means, whereby a further quantity of said gas is removed from the liquid.

13. An apparatus, as claimed in claim 12 wherein said pressure reduction means comprises a first pressure reduction device and a second pressure reduction device, said gas absorption means being connected to at least one said pressure reduction device by way of a compressor, whereby a said pressure reduction device may be operated at a pressure below that of said gas absorption device.

14. An apparatus as claimed in claim 12 including means to pass stripped effluent water in heat exchange relation with water circulating through said humidifier zone.

15. The method of operating a gas/liquid contact process in which the gas is at least partially soluble in the liquid, there being a relatively hot contact zone at an elevated pressure, including the steps of extracting at least a portion of the liquid after passage through said hot zone, progressively reducing the pressure of extracted liquid by flashing through at least a first, and then a subsequent lower, pressure reducing means to remove portions of the dissolved gas therefrom, then passing the liquid at reduced pressure countercurrent to a flow of the liquid in vapor form to further remove residues of dissolved gas, and returning the gas thus recovered to the process.

16. In an isotope concentrating process in which hydrogen sulfide gas is passed in countercurrent contact with water through a hot tower zone, a cold tower zone and humidity control means at elevated pressures, the method of recovering hydrogen sulfide gas dissolved in the water, including the steps of extracting at least a portion of the water leaving the hot zone, progressively reducing the pressure of the water portion by passage through at least a first, and then a subsequent lower, pressure reduction means to flash off portions of the gas, and then passing the water at reduced pressure countercurrent to a flow of steam to remove a further portion of the gas therefrom, and returning the hydrogen sulfide so recovered to the process.

17. The method of operating a gas/liquid counterflow process in which pressurized gas, being partially soluble in the liquid, is passed upwardly through the pressurized liquid in counterflow relation therewith through a hot exchange zone and a cold exchange zone pressurized to a first pressure above atmospheric, including the steps of increasing the pressure of feed liquid entering the process from substantially atmospheric pressure to a second pressure value intermediate atmospheric and said first pressure, passing the pressurized feed liquid to an absorber section, extracting from adjacent the bottom of said hot zone at least a portion of hot liquid having said gas absorbed therein, flashing said liquid from said first pressure to a third pressure value intermediate said first and second values, separating gas evolved by said flashing step from the extracted liquid, passing the separated gas to said absorber section for re-absorption of gas into said feed liquid, and pressurizing said feed liquid having said gas absorbed therein to said first pressure by pumped transference from said absorber section to a said exchange zone.

18. The method as claimed in claim 17, including the further step of passing said extracted hot liquid to a stripping column suitably heated to produce water vapor and remove additional gas therefrom, and passing the additional gas to said absorber section.

19. The method as claimed in claim 17, including the preliminary step of flashing said liquid to a fourth pressure greater than said third pressure and reabsorbing into said feed liquid gas evolved in said preliminary step.

20. The method as claimed in claim 17, including the step of cooling said evolved gas after flashing to condense water vapor therefrom.

21. The method as claimed in claim 20 wherein said cooling is effected by direct contact with said feed liquid and the condensing water vapor is added thereto.

22. In a gas/liquid contact apparatus having a liquid feed at substantially atmospheric pressure, a hot contact zone and a cold contact zone, means for maintaining said zones at pressures elevated above atmospheric, and means for extracting from said hot zone liquid having gas dissolved therein, a gas recovery system comprising a gas absorber and means for increasing the pressure of the liquid feed to a second pressure intermediate atmospheric and said elevated pressure and for delivering the so pressurized liquid to said gas absorber, pressure reduction means connected to said liquid extracting means for reducing the pressure of extracted liquid to a third pressure value intermediate said elevated pressure and said second pressure for releasing gas dissolved in said extracted liquid, and means for delivering the released gas to said gas absorber for absorption of gas in the feed liquid therein, and pumping means connected to receive from said absorber liquid having gas absorbed therein and for delivering the same to a said contact zone.

23. An apparatus as claimed in claim 22, including a steam stripping means connected to receive extracted liquid from said pressure reduction means and release additional gas therefrom, and means for delivering said additional gas to said gas absorber.

24. An apparatus as claimed in claim 22, including a preliminary pressure reduction means for flashing said extracted liquid to a fourth pressure greater than said third pressure, and means for absorbing the gas released by said preliminary pressure reduction means into said feed liquid.

25. An apparatus as claimed in claim 22, including means for cooling said released gas and condensing water vapor therefrom.

26. An apparatus as claimed in claim 25, wherein said absorber comprises said means for cooling said released gas by direct contact with said feed liquid.

27. The method of gas recovery and recirculation in a gas/liquid counterflow process for isotopic separation in which hydrogen sulphide is at least partially soluble in the liquid, namely water, there being a pressurized hot isotope exchange zone and a pressurized cold isotope exchange zone for effecting isotope exchange between water and the gas at a predetermined process pressure, including the steps of: extracting at least a portion of liquid effluent having said gas in solution therein; producing a substantial drop in pressure in said liquid portion to strip hydrogen sulphide gas therefrom at a pressure substantially less than that of a said exchange zone; re-compressing said gas to a pressure less than that of said exchange zone; absorbing the stripped gas into feed water entering the process as a source of deuterium, and pressurizing by pumping the feed water with gas absorbed therein to a said isotope exchange zone to return said stripped gas to said zone.

28. The method as claimed in claim 27 including the step of raising the temperature of said entering feed water by heat exchange relation with said stripped gas.

29. The method as claimed in claim 28 wherein said heat exchange is at least partly effected during said recompressing of said stripped gas, prior to said step of absorbing the stripped gas into the incoming feed water.

30. The method as claimed in claim 27 wherein said liquid portion is extracted after passage downwardly through said hot zone, including the step of raising the temperature of the liquid after said drop in pressure, to evolve additional hydrogen sulphide gas, whereby the gas content of liquid passing to waste is further reduced.

31. In an isotope exchange apparatus having a pressurized hot tower zone, a pressurized cold tower zone, and a humidifier zone providing heated hydrogen sulphide gas to the hot zone and receiving liquid from the hot zone comprising water having said gas absorbed therein, a gas stripping means connected thereto to receive at least a portion of the hot liquid leaving the hot tower zone, including an expansion chamber to provide a significant drop in pressure to said hot zone liquid to separate hydrogen sulphide gas therefrom, gas compressor means connected between said chamber and an absorption tower receiving incoming feed water therein, to re-compress said gas to a pressure less than that in said cold zone, and to pass said gas to said absorption tower wherein said gas is mixed in absorbed relation with said incoming feed water, and pump means connecting said absorption tower to said cold tower zone to pressurize and transfer the feed water and absorbed gas to said cold tower zone.

32. Apparatus as claimed in claim 31 including a heat input circuit connecting with said expansion chamber to raise the temperature of liquid therein whereby the quantity of absorbed hydrogen sulphide gas contained in said hot liquid is reduced.

* * * * *